(12) United States Patent
Matteucci et al.

(10) Patent No.: US 9,353,233 B2
(45) Date of Patent: May 31, 2016

(54) POLYISOCYANURATE FOAMS CONTAINING DISPERSED NON-POROUS SILICA PARTICLES

(71) Applicant: Dow Global Technologies LLC, Midland, MI (US)

(72) Inventors: Scott T. Matteucci, Midland, MI (US); William G. Stobby, Ann Arbor, MI (US); Daniel T. Youmans, Jr., Midland, MI (US); Beata A. Kilos, Midland, MI (US); Cathy L. Tway, Midland, MI (US); Dean Millar, Midland, MI (US); Kevin J. Bouck, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/370,193

(22) PCT Filed: Jan. 24, 2013

(86) PCT No.: PCT/US2013/022848
§ 371 (c)(1),
(2) Date: Jul. 1, 2014

(87) PCT Pub. No.: WO2013/112657
PCT Pub. Date: Aug. 1, 2013

(65) Prior Publication Data
US 2014/0363666 A1    Dec. 11, 2014

Related U.S. Application Data

(60) Provisional application No. 61/591,010, filed on Jan. 26, 2012.

(51) Int. Cl.
| | |
|---|---|
| *C08G 18/00* | (2006.01) |
| *C08J 9/00* | (2006.01) |
| *C08G 18/08* | (2006.01) |
| *C08G 18/42* | (2006.01) |
| *C08G 18/72* | (2006.01) |
| *C08K 5/54* | (2006.01) |
| *C08K 7/26* | (2006.01) |
| *C08K 3/36* | (2006.01) |

(52) U.S. Cl.
CPC .............. *C08J 9/0066* (2013.01); *C08G 18/14* (2013.01); *C08G 18/4208* (2013.01); *C08G 18/72* (2013.01); *C08K 5/54* (2013.01); *C08K 7/26* (2013.01); *C08J 2375/04* (2013.01); *C08J 2375/06* (2013.01); *C08K 3/36* (2013.01); *Y10T 428/27* (2015.01)

(58) Field of Classification Search
CPC .... C08J 2375/06; C08J 9/0042; C08G 18/14; C08G 18/4208; C08G 18/72; C08K 5/54; C08K 7/26
See application file for complete search history.

(56) References Cited

U.S. PATENT DOCUMENTS

| | | | |
|---|---|---|---|
| 2,846,408 A | 8/1958 | Brochhagen et al. | |
| 3,215,652 A | 11/1965 | Kaplan | |
| 3,470,118 A | 9/1969 | Foster | |
| 5,254,597 A * | 10/1993 | Horn et al. | 521/51 |
| 6,121,336 A | 9/2000 | Okoroafor et al. | |
| 2002/0160176 A1 | 10/2002 | Pinnavaia et al. | |
| 2004/0077738 A1 | 4/2004 | Field et al. | |
| 2006/0281825 A1 | 12/2006 | Lee et al. | |
| 2009/0047329 A1 | 2/2009 | Stucky et al. | |
| 2010/0294982 A1 | 11/2010 | Schiller et al. | |
| 2011/0288210 A1 * | 11/2011 | Pinnavaia | C08K 3/22 524/100 |
| 2014/0050928 A1 * | 2/2014 | Gebauer | B05D 7/53 428/446 |

FOREIGN PATENT DOCUMENTS

| | | | | |
|---|---|---|---|---|
| WO | 2007/011988 A2 | 1/2007 | | |
| WO | 2008/085939 A2 | 7/2008 | | |
| WO | WO-2012065828 | * | 5/2012 | B05D 7/53 |

OTHER PUBLICATIONS

PCT/US2013/022848, Jul. 9, 2013, International Search Report and Written Opinion, Jul. 9, 2013.
PCT/US2013/022848, Apr. 3, 2014, Written Opinion of the International Preliminary Examination Authority, Apr. 3, 2014.
PCT/US2013/022848, May 30, 2014, Amendment Under Rule 66, May 30, 2014.
PCT/US2013/022848, Sep. 9, 2013, Response Written Opinion, Sep. 9, 2013.
PCT/US2013/022848, Jun. 23, 2014, International Preliminary Report on Patentability.

* cited by examiner

*Primary Examiner* — Michael L Leonard

(57) ABSTRACT

Disclosed herein are polyisocyanurate and/or polyurethane foams containing non-porous silica particles derived from mesoporous cellular foams, wherein the polyisocyanurate and/or polyurethane foams have enhanced heat and/or fire resistance. Processes for making such foams and methods of using them are also disclosed.

8 Claims, No Drawings

POLYISOCYANURATE FOAMS CONTAINING DISPERSED NON-POROUS SILICA PARTICLES

FIELD OF THE INVENTION

Disclosed herein are polyisocyanurate and/or polyurethane foams containing non-porous particles derived from mesoporous cellular foams, and processes for making such polyisocyanurate foams.

BACKGROUND OF THE INVENTION

Polyisocyanurate (PIR) and polyurethane (PU) foams are used extensively for insulation and other commercial applications. Often these materials are used in situations where fire retardant properties are needed or required by law. For example, some building codes require building walls and roofs containing these products to withstand fire penetration for up to one hour. However, these foams are not sufficiently fire resistant unless they are protected with a thermal barrier, such as gypsum.

Mesoporous structures are high-surface area porous oxides, such as silicon oxides, having an average pore size of not greater than about 100 nanometers as calculated using the nitrogen adsorption/desorption isotherm, as disclosed in Stucky et al., US Patent Publication 2009/0047329. Some mesoporous oxide structures can be prepared in the form of mesocellular foams. These mesoporous structures are relatively inexpensive to prepare, are easy to handle, durable, have high resistance to photo-induced corrosion and are heat resistant.

Mesoporous structures are generally prepared by exposing a source of a metal or metalloid oxide, such as silicon oxide, for instance tetraethylorthosilicate, to cross-linking conditions with a micro-emulsion or emulsion of surfactants, and optionally micelle swelling organic solvents, in water. The metal or metalloid oxide (such as silicon oxide), crosslinks on the surface of the micelles, which may include a micelle swelling agent, to form the basic mesoporous structure. The size of the pores is related to the size of the micelles formed. The size of the surfactant micelles can be adjusted by swelling with one or more micelle swelling organic solvents. The mesoporous structures are separated from the aqueous reaction medium and the default procedure used in the literature exposes them to temperatures at which any organic materials are removed by volatilization and/or burning them out. The structures of the mesoporous materials could be altered by heating them to temperatures at which they undergo calcination, for instance up to 500° C.

The mesoporous structures are comprised of cross-linked silicon oxide units, preferably silicon tetraoxide ($SiO_4$) units. In essence chains of silicon oxide are prepared with crosslinks between the chains. In cross-linked structures a significant number of the silicon oxide units have three or four of the oxygen atoms further bonded to other silicon atoms. The cross-linked silicon oxide units are formed into structures comprised of walls forming pores which may exhibit any cross sectional shape useful in mesoporous structures, for example irregular, circular hexagonal, lamellar, and the like. These pore-forming structures may be interconnected by cross-linked silicon tetraoxide structures which are in the form of struts. The struts connecting the pore-forming structures create open areas between the walls of the pore-forming structures and the struts commonly referred to as windows. Structures containing a high percentage of these interconnected pore forming structures may be referred to as foams because they have relatively high pore volume and consequently low density. The formed structures contain a plurality of the connected pore forming structures connected by a plurality of struts and demonstrate tortuous open paths through the structure. Mesoporous structures are generally accepted to have pores having a size of about 2 nanometers or greater and a size of about 100 nanometers or less, and preferably about 50 nanometers or less as defined by IUPAC.

It would be advantageous to develop heat resistant materials, such as polyisocyanurate and/or polyurethane foams, that did not require the use of a thermal barrier.

SUMMARY OF THE INVENTION

The inventors have surprisingly found that combining polyisocyanurate and/or polyurethane foams and particles derived from mesoporous cellular foams (MCFs) results in flame resistant (FR) materials that exceed the flame resistance of polyisocyanurate and/or polyurethane foams that contain silica or other particles. These materials exhibit flame resistant properties that are superior to those of unfilled foams, i.e., polyisocyanurate and/or polyurethane foams that do not contain silica particles derived from an MCF. These materials also are superior to those prepared using other fillers, such as fumed silica, mesostructured silica, silica gel, nanoparticles, zeolite and aerogel.

In one aspect, disclosed herein is a foam comprising silica particles derived from mesoporous cellular foam and either a polyisocyanurate or a polyurethane.

In another aspect, disclosed herein are methods of preparing a flame retardant polyisocyanurate and/or polyurethane foam filled with non-porous silica derived from mesoporous cellular foams comprising:

contacting a first polyisocyanurate and/or polyurethane precursor, a second polyisocyanurate and/or polyurethane precursor, a foaming agent, a mesoporous cellular foam and optionally one or more catalysts to form a mixture, and then polymerizing the mixture.

In another aspect, disclosed herein is a method of preparing a flame retardant polyisocyanurate foam and/or polyurethane foam filled with non-porous fractured silica derived from mesoporous cellular foams comprising:

a) combining two or more polyisocyanurate and/or polyurethane precursors to form a first mixture;

b) combining the first mixture and a silica based mesoporous cellular foam to form a second mixture; wherein the second mixture comprises about 0.1-10% by weight mesoporous cellular foam and about 99.9-90% by weight polyisocyanurate and/or polyurethane precursors;

c) polymerizing the second mixture and thereby generating the non-porous silica;

wherein a foaming agent is added the first mixture, the second mixture, or both.

In another aspect, disclosed herein is a method of preparing flame retardant polyisocyanurate and/or polyurethane foam filled with non-porous silica derived from at least one mesoporous cellular foam, the method comprising:

a) combining a first liquid polyisocyanurate and/or polyurethane precursor that optionally further comprises one or more catalysts, one or more surfactants, one or more additives or combinations thereof, and at least mesoporous cellular foam to form a first mixture;

b) combining a second liquid polyisocyanurate and/or polyurethane precursor that optionally further comprises one or more catalysts, one or more surfactants, one or more additives or combinations thereof, and the first mixture to form a second mixture;

c) polymerizing the second mixture and thereby generating the non-porous silica; wherein a foaming agent is added the first mixture, the second mixture, or both, and wherein the foaming agents may be the same or different.

The products and processes disclosed herein may be used in a variety of cases, such as rollers, packing, rubber vibration insulators, synthetic leather, spandex fibers, rubber shoe soles, and in building materials, such as floor coatings and insulation, as well as in any other situation where flame resistant and/or heat resistant properties are desired.

DETAILED DESCRIPTION

As mentioned above, in one aspect disclosed herein is a foam comprising silica particles derived from a mesoporous cellular foam and either a polyisocyanurate and/or a polyurethane.

In one embodiment, the mesoporous cellular foam is has a pore volume greater than about 1.8 $cm^3/g$. In another embodiment, the pore volume is greater than about 2.0 $cm^3/g$, more preferably the pore volume is greater than about 2.5 $cm^3/g$, as determined using the BJH method. In another embodiment, the foam containing the non-porous silica contains less than about 8% by weight of the non-porous silica (based on the weight of the polyisocyanurate and/or polyurethane precursors) or more preferably less than about 7% by weight, or more preferably less than about 6% by weight or still more preferably less than about 5% by weight and most preferably less than about 3.3% by weight.

In another embodiment, the mesoporous cellular foam is has a surface area of greater than about 400 $m^2/g$, preferably greater than 500 $m^2/g$, and more preferably greater than 600 $m^2/g$, as determined using the BET method.

In a further embodiment, the composite further comprises one or more surfactants and/or one or more catalysts, both of which are described more fully below. As previously mentioned, disclosed herein are methods of preparing a flame retardant polyisocyanurate and/or polyurethane foam filled with non-porous silica derived from mesoporous cellular foams comprising:

contacting a first polyisocyanurate and/or polyurethane precursor, a second polyisocyanurate and/or polyurethane precursor, a foaming agent, a mesoporous cellular foam and optionally one or more catalysts to form a mixture, and then polymerizing the mixture.

It will be appreciated by those of skill in the art that the order of mixing the various reagents may be altered as deemed necessary.

In one aspect, the methods comprise a) combining two or more liquid polyisocyanurate and/or polyurethane precursors and optionally a foaming agent, to form a mixture of polyisocyanurate and/or polyurethane precursors;

b) dispersing a silica based mesoporous cellular foam into the mixture of polyisocyanurate and/or polyurethane precursors to form a second mixture; wherein the second mixture comprises about 0.1-10% by weight mesoporous cellular foam and about 99.9-90% by weight polyisocyanurate and/or polyurethane precursors;

c) polymerizing the second mixture and thereby generating the non-porous silica;

wherein a foaming agent is added the first mixture, the second mixture, or both, and wherein the foaming agents may be the same or different.

In a further aspect, the method of preparing flame retardant polyisocyanurate foam filled with non-porous fractured silica derived from mesoporous cellular foams composite composition comprise:

a) combining a first liquid polyisocyanurate and/or polyurethane precursor that optionally further comprises one or more catalysts, one or more surfactants, one or more additives or combinations thereof, and at least mesoporous cellular foam to form a first mixture;

b) combining a second liquid polyisocyanurate and/or polyurethane precursor that optionally further comprises one or more catalysts, one or more surfactants, one or more additives or combinations thereof, and the first mixture to form a second mixture;

c) polymerizing the second mixture and thereby generating the non-porous silica;

wherein a foaming agent is added the first mixture, the second mixture, or both, and wherein the foaming agents may be the same or different.

Combining entails mixing, stirring, agitation or other means known in the art.

After polymerization, the resulting foam contains little, if any, porous silica, as determined using the BET method.

In one embodiment of all of the above aspects, polyisocyanurates are the preferred precursor.

"Polyurethane" is a polymer comprising isocyanate linkages between organic units. Desirably, the isocyanate linkages are carbamate ("urethane") bonds that result from the reaction of an isocyanate functional group with a hydroxyl functional group.

"Polyurethane foam" is a polymeric foam whose polymer network comprises urethane linkages. Polyurethane foams can contain isocyanurate linkages where the amount of the isocyanurate groups in the final polyurethane foam is the result of reacting less than 25% of the available isocyanate groups into isocyanurate linkages.

"Polyisocyanurate foam" is a polymeric foam whose polymer network comprises of isocyanurate linkages made from the cyclic polymerization of three isocyanate groups where the amount of the isocyanurate groups in the final polyisocyanurate foam is the result of reacting at least 25% of the available isocyanate groups into isocyanurate linkages.

"Isocyanate linkage" is a bond formed by the reaction of an isocyanate and a functional group that is reactive with an isocyanate (for example, a hydroxyl group or two other isocyanates which form an isocyanurate structure or water which form a urea structure).

"Filled foams" are polyisocyanurate and/or polyurethane foams that contain the non-porous silica particles derived from the mesoporous cellular foams.

"Unfilled foams," are polyisocyanurate and/or polyurethane foams that do not contain silica particles derived from a mesoporous cellular foam.

At least one of the polyisocyanurate precursors is a polyisocyanurate, i.e., contains at least two isocyanate functionalities per molecule. It can be any isocyanate-containing compound used to prepare thermoset foam. Suitable isocyanate-containing compounds include: aliphatic polyisocyanates, cycloaliphatic isocyanates, aromatic polyisocyanates and any combinations thereof. A crude polyisocyanate may also be used, such as crude toluene diisocyanate obtained by the phosgenation of a mixture of toluene diamine or the crude diphenylmethane diisocyanate obtained by the phosgenation of crude methylene diphenylamine. Preferred are aromatic polyisocyanates such as disclosed in U.S. Pat. No. 3,215,652. Especially preferred are methylene-bridged polyphenyl polyisocyanates and mixtures thereof with crude diphenylmethane diisocyanate, due to their ability to cross-link the polyurethane. Desirably, the isocyanate-containing compound is methylene diphenyl diisocyanate (MDI), polymeric methylene diphenyl diisocyanate (polymeric MDI), or a combination thereof.

The isocyanate-containing compounds desirably have an average functionality of 2 or more, preferably, 2.4 or more, still more preferably 2.7 or more. At the same time, it is desirably for the isocyanate-containing compound to have on average a functionality 3.5 or less and preferably 3.2 or less.

At least one of the liquid polyisocyanurate precursors is a polyol. Suitable polyols include polyether or polyester polyols as well as aromatic polyols. Polyols which may be present in the polyol composition include one or more other polyether or polyesters polyols of the kind typically employed in processes to make the foam. Other compounds having at least two isocyanate reactive hydrogen atoms may also be present, for example polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. Mixtures of two or more of the aforesaid materials may also be employed.

The term "polyester polyol" as used in this specification and claims includes any minor amounts of unreacted polyol remaining after the preparation of the polyester polyol and/or unesterified polyol (for example, glycol) added after the preparation of the polyester polyol. Suitable polyester polyols can be produced, for example, from aliphatic organic dicarboxylic acids with 2 to 12 carbons, preferably aliphatic dicarboxylic acids with 4 to 6 carbons, and multivalent alcohols, preferably diols, with 2 to 12 carbons. Examples of aliphatic dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The corresponding dicarboxylic acid derivatives may also be used such as dicarboxylic acid mono- or di-esters of alcohols with 1 to 4 carbons, or dicarboxylic acid anhydrides. Examples of divalent and multivalent alcohols, especially diols, include ethanediol, diethylene glycol, glycerine and trimethylolpropanes or mixtures of at least two of these diols.

Useful aromatic polyols include aromatic polyether polyol or an aromatic polyester polyol or combinations of the two. Particularly desirably aromatic polyester polyol is an aromatic dicarboxylic acid with 8 to 24 carbons. While the aromatic polyester polyols can be prepared from substantially pure aromatic dicarboxylic acids, more complex ingredients are advantageously used, such as the side stream, waste or scrap residues from the manufacture of phthalic acid, terephthalic acid, dimethyl terephthalate, and polyethylene terephthalate. Other residues are dimethyl terephthalate (DMT) process residues, which are waste or scrap residues from the manufacture of DMT. The present applicants have observed that for certain applications it is particularly advantageous for reasons of foam performance and processing to have present in the polyol composition both the "Novolac" polyol and an additional aromatic polyol which can be an aromatic polyether or aromatic polyester polyol.

Polyether polyols that additionally may be present include those which can be obtained by suitable organic amine initiators, either aliphatic or aromatic amines, which may be condensed with alkylene oxides. Preferable amines include monoethanolamine, vicinal toluenediamines, ethylenediamines, and propylenediamine.

A catalyst may be used to facilitate the polymerization step. The catalyst may be added in any or all steps. If desired, more than one catalyst may be used; in such a case, the catalysts may be added either simultaneously or sequentially. Any suitable urethane catalyst is acceptable, including tertiary amine compounds and/or organometallic compounds. Exemplary tertiary amine compounds include triethylenediamine, N-methylmorpholine, N,N-dimethylcyclohexylamine, pentamethyldiethylenetriamine, tetramethylethylene-diamine, 1-methyl-4-dimethylaminoethylpiperazine, 3-methoxy-N-dimethylpropylamine, N-ethylmorpholine, diethylethanolamine, N-cocomorpholine, N,N-dimethyl-N', N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide may also be employed herein alone or in combination with a urethane catalyst. Such catalysts are used in an amount which measurably increases the rate of polyurethane or polyisocyanurate formation. Typical catalysts include diethylene or dipropylene glycol mixtures with potassium salts of carboxylic acids containing from 3 to 12 carbons, especially from 3 to 8 carbons. The carboxylic acids may be linear or branched. Typical amounts are 0.001 to 15 parts of catalyst per 100 parts by weight, preferably, 4 to 12 parts of catalyst per 100 parts by weight of total polyol.

The catalyst (reaction catalyst) is typically present in the polyol-containing composition prior to mixing with the isocyanate-containing composition. However, the catalyst can also or alternatively be added as a separate component while mixing the polyol-containing composition and the isocyanate-containing composition.

Acceptable foaming agents are known in the art and include water, SH 80:20, alcohol ethoxysulfates, azodicarbonamide, sulfohydrazide, sodium bicarbonate and combinations thereof. Water is a preferred foaming agent.

Blowing agents may also be used. Suitable blowing agents include any one or combination of more than one of the following: hydrochlorofluorocarbons, hydrofluorocarbons and hydrocarbons. The blowing agent is preferably used in an amount of from 2 to 30 parts, preferably 2 to 15 parts, more preferably from 4 to 10 parts, per 100 parts by weight of the polyol-containing composition. Suitable hydrofluorocarbons in include hydrofluoroalkanes, fluoroalkanes, hydrofluoroalkanes and fluoroalkenes. Suitable hydrofluoroalkanes are the $C_1$-$C_4$ compounds including difluoromethane (R-32), 1,1,1,2-tetrafluoroethane (R-134a), 1,1-di-fluoroethane (R-152a), difluorochloroethane (R-142b), trifluoromethane (R-23), heptafluoropropane (R-227a), hexafluoropropane (R136), 1,1,1-trifluoroethane (R-133), fluoroethane (R-161), 1,1,1,2,2-pentafluoropropane (R-245fa), pentafluoropropylene (R2125a), 1,1,1,3-tetrafluoropropane, tetrafluoropropylene (R-2134a), 1,1,2,3,3-penta-fluoropropane and 1,1,1,3,3-pentafluoro-n-butane. When a hydrofluorocarbon blowing agent is present, preferred is tetrafluoroethane (R-134a), pentafluoropropane (R-245fa) or pentafluorobutane (R-365). Suitable hydrocarbons for use as blowing agent include nonhalogenated hydrocarbons such as butane, isobutane, 2,3-dimethylbutane, n- and iso-pentane isomers, cyclopentane, hexane isomers, heptanes isomers and cycloalkanes including cyclopentane, cyclohexane and cycloheptane and blends thereof.

Preferred hydrocarbons for use as blowing agent include cyclopentane and notably n-pentane or iso-pentane and blends thereof. In a preferred embodiment of this invention the polyol composition comprises a physical blowing agent selected from the group consisting of tetrafluoroethane (R-134a), pentafluoropropane (R-245fa), pentafluorobutane (R-365), cyclopentane, n-pentane and iso-pentane.

And if desired, further additives, such as surfactants may be added to the reaction mixture. Examples of surfactants include non-ionic alkyl polyethylene oxide, alkyl and aryl polyethylene oxide, polyethylene oxide-propylene oxide block co-polymer, and sorbitan polyethylene oxide molecules. Specific examples of surfactants include, for example, DABCO™ DC193 (supplied by Air Products), which has Polydimethylsiloxane (PDMS) backbone and polyethylene oxide-co-propylene oxide (PEO-PPO) random copolymer grafts; TEGOSTAB™ B8488 (supplied by Evonik), which has a polydimethylsiloxane (PDMS) backbone and polyethylene oxide-co-propylene oxide (PEO-PPO) random copolymer grafts with viscosity of 1000 cPs, insoluble in water; TEGOSTAB™ B8526 (supplied by Evonik), which has a polydimethylsiloxane (PDMS) backbone and polyethylene oxide-co-propylene oxide (PEO-PPO) random copolymer grafts with viscosity of 3000 cPs, insoluble in water; TEGOSTAB™ B8535 (supplied by Evonik), which has a Polydimethylsiloxane (PDMS) backbone and polyethylene oxide-co-propylene oxide (PEO-PPO) random copolymer grafts with viscosity of 1200 cPs, Cloud point of 59 C; and VORASURF™ 504 (supplied by The Dow Chemical Company), wich is a polyethylene oxide-co-butylene oxide tri-block organic surfactant with equivalent weight of 3400 and nominal viscosity of 3300 cPs at 25 C.

As will be appreciated by one of no more than ordinary skill in the art, dispersing the silica based mesoporous cellular foam into the mixture of polyisocyanurate precursors may be accomplished by any of a number of different methods, including mechanical mixing.

The silica based mesoporous cellular foam may be dispersed into a mixture of the two or more liquid polyisocyanurate precursors or it may be dispersed into a single liquid polyisocyanurate precursor and then the other precursor or precursors and/or catalysts may be added.

In one embodiment, the second mixture in any of the aforementioned aspects, comprises about 0.25 to 10 weight percent mesoporous cellular foam and about 99.75-90% by weight polyisocyanurate precursors; more preferably, the second mixture comprises about 0.5 to 5% by weight mesoporous cellular foam and about 99.5-95% by weight polyisocyanurate precursors.

The reaction may be carried out in a solvent, or it may be carried out neat. Additionally, if desired, the polymerization reaction may be carried out either under an inert atmosphere or standard atmospheric conditions.

The filled foams (those that contain the mesoporous cellular foam) as disclosed herein demonstrate R/in values that are comparable to the unfilled foam (i.e., without the mesoporous cellular foam). Thus, the filled foams have utility in thermal insulation applications.

The filled foams have PEAK SEA values that are less than those of corresponding foams that do not contain the silica particles derived from the mesoporous cellular foams.

The total heat release (MJ/m$^2$) for filled foams are superior to those of unfilled foams.

The mesoporous cellular foam particles in the filled foams exhibit significant, i.e., at least 50% pore volume loss after foaming/polymerization, as determined by the BJH method. More preferably, the filled foams exhibit at least a 75% (still more preferably, at least 90%, and still more preferably, at least 95%) pore volume loss after foaming/polymerization.

Without wishing to be held to a particular theory, it is believed that the performance of MCF comes from their highly porous structure combined with their inherent, friable nature. It is believed that during the foaming process the particles are broken apart, which results in the deposition of silica within or on the walls and struts of the polymer foam, as compared to materials that just form large aggregates (e.g., Comparative Examples D, E, and F). These silica particles are therefore better dispersed than can be achieved using dense silica particles or mesostructured porous silicas under similar mixing conditions. It is believed that the FR properties of the MCF filled composites are caused, at least in part, by the dispersion of the MCF particles throughout the composite, as compared to the other tested particles, which aggregate.

After foaming/polymerization, the resulting non-porous silica has a pore volume that is at least 70% less (more preferably, at least 80% less, still more preferably, at least 90% less and even more preferably, 95% less) than that of the mesoporous cellular foam before foaming, when measured using the BJH method.

The silica particles derived from the mesoporous cellular foams are inorganic; i.e., they do not contain any organic groups, as aerogels do. Therefore, the silica particles are inflammable, while at least the organic components of the aerogel particles are capable of combusting. The organic groups in the aerogels are also hydrophobic, which at least partially repels the polyisocyanurate precursors and thereby prevents them from enter the cavities in the aerogel. The silica particles derived from the mesoporous cellular foams do not suffer from this problem.

EXAMPLES

The following examples and results further exemplify the subject matter disclosed herein and are based on using the polyisocyanurate mixture of Table 1.

TABLE 1

|  | Identity/Purpose | Weight, g |
|---|---|---|
| Component A Batch | | |
| Papi 20 | Polymeric isocyanate (Avg. MW = 400) | 346 |
| Component B Batch | | |
| Terate 3512A | Aromatic polyester polyol | 650.00 |
| Vorasurf 504 | Surfactant | 39.00 |
| RB7940 | Catalyst | 24.05 |
| Pelcat 9887E | Catalyst | 32.50 |
| SH 80:20 | Foaming Agent | 145.60 |
| Water | Foaming Agent | 2.99 |
| Total Component | | 894.14 |
| Component B | | 275.12 |
| Component A | | 346.00 |

An additional inorganic component/particle [as shown in Table 2] is added to the formulation. The component/particle is added to Component B and mixed. The component/particle comprises 3.98 g of material for 0.625% by weight filled composites and 15.92 g of material for 2.5% by weight filled composites.

The foams are prepared by premixing Component B and the component/particles using a high speed blender. Once the particles are visually judged to be mixed, 346 g of Component A is added. The resulting mixture is then mixed using a high speed (approximately 3,500-5,000 rpm) blender for ~9 seconds, and then poured into a rectangular form. Samples generally gel and solidify in less than 70 seconds.

Descriptions of the silicas and the loadings of particles in the various samples that were tested, are listed in Table 2.

TABLE 2

Examples and comparative example used in foaming experiments

| Sample | Particle Type | Material | Particle Loading, % by weight | Source |
|---|---|---|---|---|
| Example 1 | MCFs | Dow Ex | 0.625 | Dow |
| Example 2 | MCFs | Dow Ex | 2.5 | Dow |
| Comparative Example A | None | None | 0 | |
| Comparative Example B | Fumed Silica | Aerosil 300 | 0.625 | Degussa |
| Comparative Example C | Fumed Silica | Aerosil 300 | 2.5 | Degussa |
| Comparative Example D | Mesostructured Silica | MSU-H, MCM-41 | 2.5 | Sigma Aldrich |
| Comparative Example E | Silica Gel | Davisil | 2.5 | Sigma Aldrich |
| Comparative Example G | Nanoparticles | Silica Nanoparticles | 2.5 | Sigma Aldrich |
| Comparative Example F | Zeolite | Faujasite | 2.5 | |
| Comparative Example H | Aerogel | Nanogels | 0.625 | Cabot |
| Comparative Example I | Aerogel | Nanogels | 2.5 | Cabot |

The differences between the various samples can be demonstrated using four metrics: 1) thermal resistivity as indicated by R/in, 3) total heat release rate, and 4) peak SEA (smoke extinction area) as measured by cone calorimetry. The method used for analysis will be discussed for each metric separately.

The R-value was determined using ASTM C518 (Standard Test Method for Steady-State Thermal Transmission Properties by Means of the Heat Flow Apparatus), peak SEA, and total heat release rate were determined using ASTM E 1354 (Standard Test Method for Heat and Visible Smoke Release Rates for Materials and Products using an Oxygen Consumption calorimeter) at 50 kw. Test samples were 100 mm by 100 mm and were preformed into a flat panel up to 50 mm thick. All experiments were conducted at ambient atmospheric conditions and $O_2$ concentrations.

BET Analysis and Porosity Calculation

The surface area, pore size and pore volumes of the porous materials were measured by nitrogen adsorption at 77.4 K using the conventional technique on a Micromeritics ASAP 2420 apparatus. Prior to the adsorption measurements, the samples were degassed in vacuum at 250° C. for at least 3 hours. The pore size distributions, average pore diameter and pore volumes were determined from the adsorption and desorption branch of isotherms using the Barret-Joyner-Halenda (BJH) procedure: Barrett, E. P.; L. G. Joyner, P. P. Halenda (1951). "The Determination of Pore Volume and Area Distributions in Porous Substances. I. Computations form Nitrogen Isotherms". *J. Am. Chem. Soc.* 73 (1): 373-380. The surface area was calculated using BET method.

Once the pore volume of sample was obtained, its porosity was calculated based on below formula:

$$\text{Porosity} = \frac{SiO_2 \text{ Skeletal density} * \text{Pore volume(from } N_2 \text{ ads/des)}}{1 + SiO_2 \text{ Skeletal density} * \text{Pore volume}} * 100\%$$

Where skeletal density=2.2 g/cm³ for hydrophilic materials

It has been found that adding non-porous fractured silica derived from porous silicas to polyisocyanurate or polyurethane formulations can have a significant influence on thermal insulation and fire resistance properties even at low particle loadings. These results for the low density porous silicas (i.e., aerogels and MCFs) are compared to other porous silica and high surface area materials. Perhaps the most important property for a particle in any type of insulation is its influence on thermal insulation. A substantial reduction in R/in would disqualify the material as a viable FR additive in insulation as its R/in is the truly marketable property of the foam, while FR is generally used to satisfy building codes.

Peak SEA (i.e., Smoke Extinction Area) is another parameter where lower values are considered better. Out of all of the materials that were tested, no material is at a 95% confidence level statistical difference in Peak SEA as compared to the control.

TABLE 5

PEAK SEA (m²/kg)

| Sample | Particle Type | Mean |
|---|---|---|
| Example 1 | MCFs | 1432 |
| Example 2 | MCFs | 1439 |
| Comparative Example A | None | 2344 |
| Comparative Example C | Fumed Silica | 1429 |

Total heat release rate is another parameter where lower values are considered better. As can be seen in Table 6, the total peak heat release rates for Examples 2, Comparative Example C, and Comparative Example I are below that of Comparative Example A, thus showing an improvement.

TABLE 6

Total heat release (MJ/m²)

| Sample | Particle Type | Mean |
|---|---|---|
| Example 1 | MCFs | 8.9 |
| Example 2 | MCFs | 7.6 |
| Comparative Example A | None | 11.3 |
| Comparative Example B | Fumed Silica | 8.4 |
| Comparative Example C | Fumed Silica | 5.7 |
| Comparative Example H | Aerogel | 9.2 |
| Comparative Example I | Aerogel | 6.7 |

While the results in Table 6 are based on at least two trials, Examples 1, 2, and Comparative Example A are based on greater than 20 trials and Comparative Examples H and I are based on at least 10 trials.

The breakdown of particles in isocyanurate foams has been demonstrated by using $N_2$ ads/des measurements. The particles used for Examples 1 and 2, as well as Comparative Examples D, E, and F are porous; however, after foaming and then thermally removing the organic polymer, we have observed the particles from Examples 1, 2 (Comparative Examples H and I were not tested) exhibit a loss of pore volume of at least 1.875 cm³/g. We have not observed similar losses in pore volumes for the other particles that we have treated. The particles for Comparative Examples B, C, and G have not been tested, since these particles are not porous.

TABLE 7

BJH desorption pore volume (cm³/g) from the particle before and after foaming.

| Sample | Pore volume before foaming, cm³/g | Pore volume after foaming, cm³/g | Pore volume loss, cm³/g |
|---|---|---|---|
| Examples 1 and 2 | 2.36 | 0.05 | 2.31 |
| Comparative Example D | 0.97 | 0.04 | 0.965 |
| Comparative Example E | 0.94 | 0.50 | 0.44 |
| Comparative Example F | 0.16 | 0.08 | 0.16 |

TABLE 8

Property Summary

| Sample | Organic surface chemistry | Mean R/in | Mean Peak SEA | Mean total Heat Release | Loss of Pore Volume Upon Polymerization and removal of polymer, cm³/g |
|---|---|---|---|---|---|
| Example 1 | No | 6.0 | 1432 | 8.9 | 2.31 |
| Example 2 | No | 6.0 | 1439 | 7.6 | 2.31 |
| Comparative Example A | — | 6.1 | 2344 | 11.3 | Not applicable |
| Comparative Example B | | 6.2 | 1768 | 8.4 | Not applicable |
| Comparative Example C | | 4.9 | 1429 | 5.7 | Not applicable |
| Comparative Example D | | 6.0 | 1884 | 10.7 | 0.965 |
| Comparative Example E | | 5.9 | 1477 | 7.1 | 0.44 |
| Comparative Example G | | 6.2 | 1087 | 11.0 | Not applicable |
| Comparative Example F | | 5.6 | 1496 | 9.0 | 0.16 |
| Comparative Example H | Yes | 6.4 | 2736 | 9.2 | Not tested |
| Comparative Example I | Yes | 6.4 | 2046 | 6.7 | Not tested |

What is claimed is:

1. A method of preparing flame retardant polyisocyanurate foam filled with silica derived from mesoporous cellular foams, comprising:
    a) combining a first liquid polyisocyanurate precursor that optionally further comprises one or more catalysts, one or more surfactants, one or more additives or combinations thereof, and silica derived mesoporous cellular foam having a pore volume greater than 2.0 cm³/g and a surface area of greater than 400 m²/g to form a first mixture;
    b) combining a second liquid polyisocyanurate precursor that optionally further comprises one or more catalysts, one or more surfactants, one or more additives or combinations thereof, and the first mixture to form a second mixture;
    c) polymerizing the second mixture and thereby generating silica particles having a pore volume of less than 0.2 cm³/g from the mesoporous cellular foam;
    wherein a foaming agent is added to the first mixture, the second mixture, or both.

2. A method according to claim 1, wherein the second mixture comprises about 0.25 to 10 weight percent mesoporous cellular foam and about 99.75-90% by weight polyisocyanurate precursors.

3. A method according to claim 1, wherein the second mixture comprises about 0.5 to 5 weight percent mesoporous cellular foam and about 99.5-95% by weight polyisocyanurate precursors.

4. A method according to claim 1, wherein one of the polyisocyanurate precursors is methylene diphenyl diisocyanate (MDI) or polymeric MDI.

5. A method according to claim 1, wherein one of the polyisocyanurate precursors is a polyester.

6. A method according to claim 1, further comprising the presence of a catalyst in the second mixture.

7. A method according to claim 6, wherein the catalyst is a tertiary amine compound and/or organometallic compound.

8. A method according to claim 1, wherein the foaming agent is water.

* * * * *